US009213777B2

(12) United States Patent
Chan et al.

(10) Patent No.: US 9,213,777 B2
(45) Date of Patent: Dec. 15, 2015

(54) METHOD AND APPARATUS FOR ARCHIVING DYNAMIC WEBPAGES BASED ON SOURCE ATTRIBUTES

(71) Applicant: Apple Inc., Cupertino, CA (US)

(72) Inventors: Ada Y. Chan, San Jose, CA (US); Alice Liu, Santa Clara, CA (US); Brady K. Eidson, San Jose, CA (US); Steven J. Falkenburg, Los Altos, CA (US); Jessie Berlin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 13/719,151

(22) Filed: Dec. 18, 2012

(65) Prior Publication Data

US 2014/0173414 A1 Jun. 19, 2014

(51) Int. Cl.
*G06F 17/30* (2006.01)
*G06F 17/22* (2006.01)

(52) U.S. Cl.
CPC ........ *G06F 17/3089* (2013.01); *G06F 17/2247* (2013.01)

(58) Field of Classification Search
CPC .................................................. G06F 17/2247
See application file for complete search history.

(56) References Cited

U.S. PATENT DOCUMENTS

| 7,743,334 | B2 | 6/2010 | Rider |
| 8,117,315 | B2 | 2/2012 | Diep et al. |
| 2008/0115055 | A1* | 5/2008 | Sadovsky et al. ............. 715/255 |
| 2011/0145698 | A1 | 6/2011 | Penov et al. |
| 2012/0310893 | A1* | 12/2012 | Wolf et al. .................... 707/661 |
| 2013/0326329 | A1* | 12/2013 | Goel ............................ 715/234 |

OTHER PUBLICATIONS

Filip Boudrez and Sofie Van den Eynde, "David, Archiving Websites", Jul. 2002, retrieved from http://www.edavid.be/davidproject/teksten/Rapporten/Report5.pdf on Jun. 1, 2015.*
Andrew Sinkov, "Introducing Evernote Clearly: One Click for Distraction-Free Online Reading", Nov. 16, 2011, Evernot Products Noteworthy Blog the Trunk, 4 pages.

* cited by examiner

*Primary Examiner* — Cesar Paula
*Assistant Examiner* — Konrad Kulikowski (57) ABSTRACT

One embodiment of a method for archiving and restoring web pages can remove elements from web data to be stored as web archive data that can cause two or more substantially similar elements to appear within a web page later created from the web archive data. In another embodiment, a web page can be constructed from web archive data. This constructed web page may not be displayed, but can be inspected for substantially similar elements so that those elements can be removed. After the elements are removed, then the web page can be displayed to a user. Either embodiment can be used alone or in parallel to reduce the appearance of substantially similar elements within a web page constructed from a web archive.

25 Claims, 10 Drawing Sheets

FIG. 10

METHOD AND APPARATUS FOR ARCHIVING DYNAMIC WEBPAGES BASED ON SOURCE ATTRIBUTES

FIELD OF THE DESCRIBED EMBODIMENTS

The described embodiments relate generally to saving and archiving web pages and more particularly to methods for preventing duplicate content from being generated when an archived web page is displayed.

BACKGROUND

Web pages are widely used to distribute information though the Internet and intranets to users possessing access to a network having connectivity to a web server storing and serving the web pages. Web pages have become a widely accepted vehicle for disseminating information because they can be easily accessed by a wide variety viewing platforms. Of course personal computers can display web pages, but the ability to access web pages goes beyond personal computers to include laptop computers, personal digital assistants, net books, e-readers, smart phones, tablet computers and more.

Although once simple, web pages now can be relatively complex including scripts, frames, embedded videos, embedded audio and the like. Web pages can be dynamic in nature. Content for dynamic web pages can be drawn from separate, discrete sources, rather than a single repository. Dynamic web page data can be retrieved from their sources just prior to display in a web browser. Often, dynamic web page data can be retrieved and displayed in the web browser by executing a script included in the web page source. When a user navigates to a relatively complex web page, source web page data such as HTML (hyper text mark-up language), XML (extended mark-up language) or the like is retrieved.

Web browsers can offer functionality by allowing a web page to be archived or saved so that it can be viewed at a later time when the web browser no longer has a connection to the Internet or intranet. Archiving a currently displayed web page (also referred to as a live web page, particularly when the displayed web page includes dynamic content) usually includes the steps of evaluating the live web page that has been retrieved and producing one or more files that can be archived. The archived files can be converted back to a live web page by simply evaluating the archived files, including running the scripts that were captured during the archiving process. Unfortunately, the display of archived web page data can sometimes result in erroneous web data being displayed. A common error can be a duplication of images shown in a web page. For example, the duplication can be caused by the inclusion of an image captured during the archive process and also the inclusion of an image included by the execution of a script included in the archived web data such as JavaScript™.

The display of replicated images as the web page is display can confuse a user, delay the display process and in some cases cause the web browser to error and, in extreme cases, can cause the web browser stop running. Therefore what is desired is a way to archive and restore web browser data that reduces duplication errors when the web page is displayed.

SUMMARY OF THE DESCRIBED EMBODIMENTS

This paper describes various embodiments that relate to creating an archive of web data and restoring a web page based on the web data archive. In particular, the restored web page can have a reduced amount of erroneously included repeated elements. In one embodiment a method for archiving web pages can include the steps of receiving web data from a server, constructing a web page from the received web data, serializing the constructed web page to create intermediate web data, removing third party dynamically added content from the intermediate web data forming archive web data and storing the archive web data.

In another embodiment a method for removing substantially similar content from a web page constructed from a web page archive can include the steps of receiving the web page archive by a processor, constructing web page data from the received web page archive, evaluating the constructed web page data for substantially similar web page content, removing at least one instance of the substantially similar web page content forming modified web page data and displaying the modified web page data.

In other embodiment, computer code removing similar web page elements from a web page constructed from a web page archive and include computer code for receiving the web page archive, computer code for forming web page data from the web page archive, computer code for identifying similar web page elements contained within the web page data, computer code for removing at least one instance of a similar web page element forming a modified web page data and computer code for displaying the modified web page data.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Web browsers can allow users to save copies of web pages for later use. This function can be useful, for example, when a user wishes to be able to view a web page at a time when no Internet or intranet connection is available. When a user initially navigates to a web page, source web page data such as HTML (hyper text mark-up language) can be retrieved. Often, this source web page data can include dynamic web data that can be retrieved and displayed in the browser by executing a script included in the web page data. For instance, a script included in the source data for a web page can incorporate additional web elements through inline-frames (abbreviated herein as iframes) that can load third party content such as advertisements from a different server.

After the source html is received and scripts executed, the browser can process the html to form a document object model (DOM) representation by organizing nodes within the HTML document into a tree structure called a DOM tree. The DOM tree can then allow the browser to construct any data structures necessary to display the web page in a browser window. The DOM tree can also provide an environment in which JavaScript can sense the state of the browser and modify the appearance of the web page, if required.

When a web page is archived, the browser can convert the DOM tree for the web page back into an HTML document through a process called serialization. However, this HTML document can be different from the original HTML source data that generated the DOM tree. In one embodiment, the HTML can represent all elements presently displayed in the web browser, including, for example, images and advertisements that have been included into the web page by the execution of scripts. For example, a script such as JavaScript® that is included in the web page source (HTML) can modify or add additional content such as images to the web page. If these changes are made before the web page is archived, then the serialization process can include the additional and modified features of the web page in the archived HTML document. This can cause multiple instances of some objects to be displayed as a web archive is restored from the web archive and displayed. For example, an image can be added by a script and a duplicate image can be sourced from the HTML in the web archive. As a result, when the browser restores the archived data, both the additional content and the script that created the additional content can be included in the new DOM tree constructed from the archived web data. The existence of duplicate content in the live web page can negatively impact the user's ability to use and understand the web page. Furthermore, in some situations duplicate content can cause problems with the internal workings of the web page, causing the web page to malfunction or become unresponsive.

Several methods are described herein for avoiding the creation of duplicate content when a web page is archived and then later restored. In one embodiment, duplicates can be filtered out during the serialization process. Often times, duplicate content can be created when elements such as images are dynamically inserted from third party servers into the web page. For example, web pages commonly incorporate advertisements in this manner. Individual iframes and objects within a web page can come from a first party (the server hosting the web page) or a third party server. Objects that are determined to originate from third party servers can be excluded when a web page archive is created excluding the content added from the third party server. This can prevent duplicate content from being generated when the archived html document is restored by the browser and converted into a live web page.

In another embodiment, archived web data files can be examined after the serialization process to identify and delete duplicate web content. For example, one method can look for multiple elements with the similar "id" attributes—which can be used to uniquely identify a web element—and delete one of the elements having that attribute. In another embodiment, web elements that have a similar HTML source tag attribute can be identified and one of the identified elements can be deleted. In still another embodiment, the algorithm can convert the archived HTML document into a web page and then run the serialization process again. If the newly created HTML document contains content that was not in the original archived HTML document, then the duplicating elements can be identified and removed.

Figure 1:
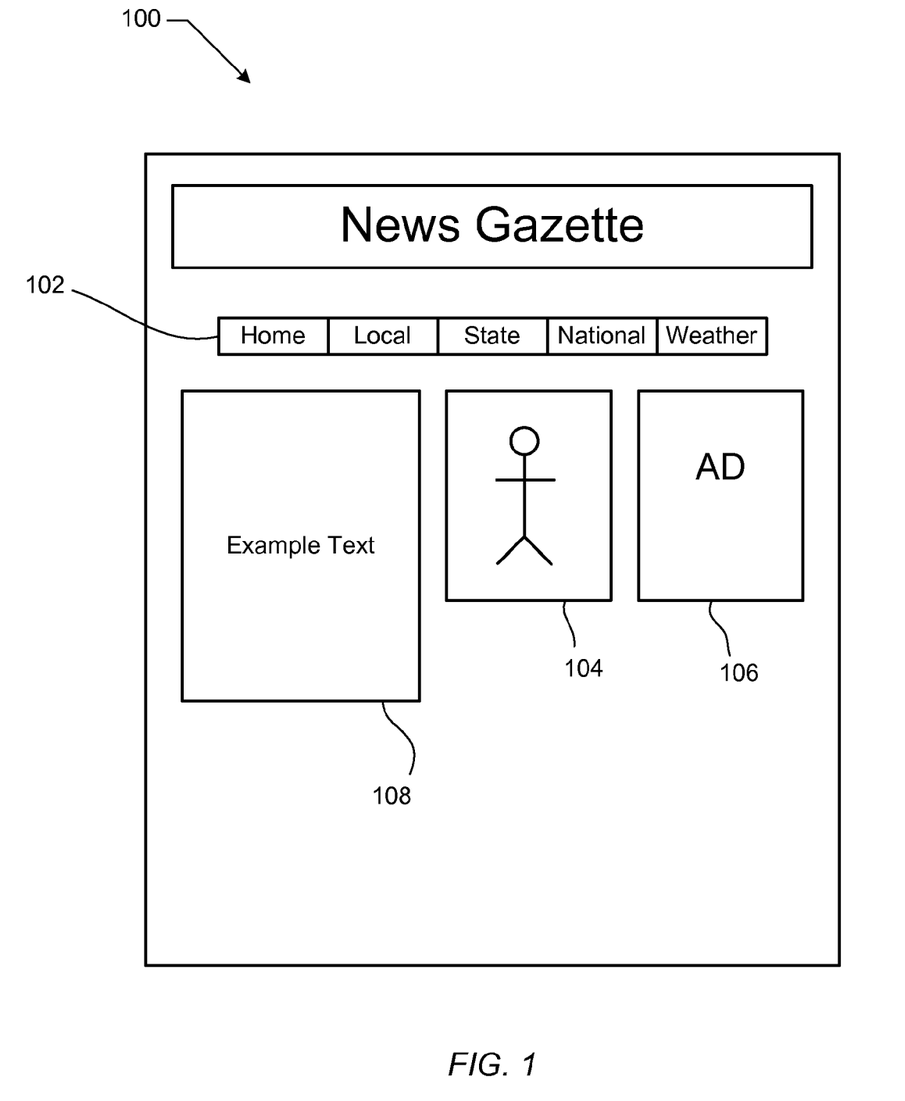
FIG. 1 is a graphical representation of an exemplary web page.

FIG. 1 is a graphical representation of an exemplary web page 100. Web page 100 can be displayed within a web browser displayed on a computing device, a mobile computing device, a mobile communication device, a personal digital assistance or other technically feasible device. In one embodiment, web page 100 can be described with one or more files that are stored, often remotely, on a server. For example, web page 100 can be described with HTML files that can describe web page 100 content, and can include text fields. Web page 100 can also be described with cascading style sheets (CSS) that can describe a look and format for one or more web pages. Web page 100 can be describe with scripts that can be executed and can further incorporate elements such as advertisements or banners into web page 100. Images (jpeg files or gifs, for example) can also be incorporated into web page 100. Although only four types of files are mentioned here, the methods and procedures described herein are not meant to be limited to only these four particular file types. Other files and file types are possible. For example, XML files can be used to describe at least a portion of web page 100.

Web page 100 can include text with text field 108. As described above, web page 100 can include one or more scripts that can, in turn, include an element in web page 100 such as an iframe. In one embodiment, the iframe can be specifically included by a web page author. For example, banner 102 can be included by the web page author to assist in navigating through a web site. As an example, if web page 100 is a newspaper type of web site, banner 102 can provide links to different sections of the web site drawn to different types of news. In this example, banner 102 can be included as an iframe by the author. Such iframes can include a source attribute that can indicate where the iframe originated. Continuing the newspaper example, if the domain of the web site is "my_news.com" then the source attribute of the iframe banner 102 can be "my_news.com" or "banner.my_news.com". Thus, the source attribute of the iframe can show a direct relation to the main web site.

Other times, an object, such as an image, can be included in web page 100 by the web author. As shown, object 104 can be included in web page 100. Again, the object 104 can be inserted in web page 100 with a script. Similarly, as before, object 104 can include a source attribute to describe where the object can have originated. Thus, if the web author included object 104, object 104 can include a source attribute similar to the domain of the web site.

Oftentimes, however, web elements can be included in a web page that does not come directly from the web author. Examples of such web elements can be an object such as an iframe or an image that is included by a third party script. Third party scripts can be scripts that can come from any source other than the web author. For example, advertisements can be inserted by a web host or other third party into a web page. Unfortunately, third party objects and iframes can often be duplicated as described above when a web page is extracted from a web archive.

Figure 2:
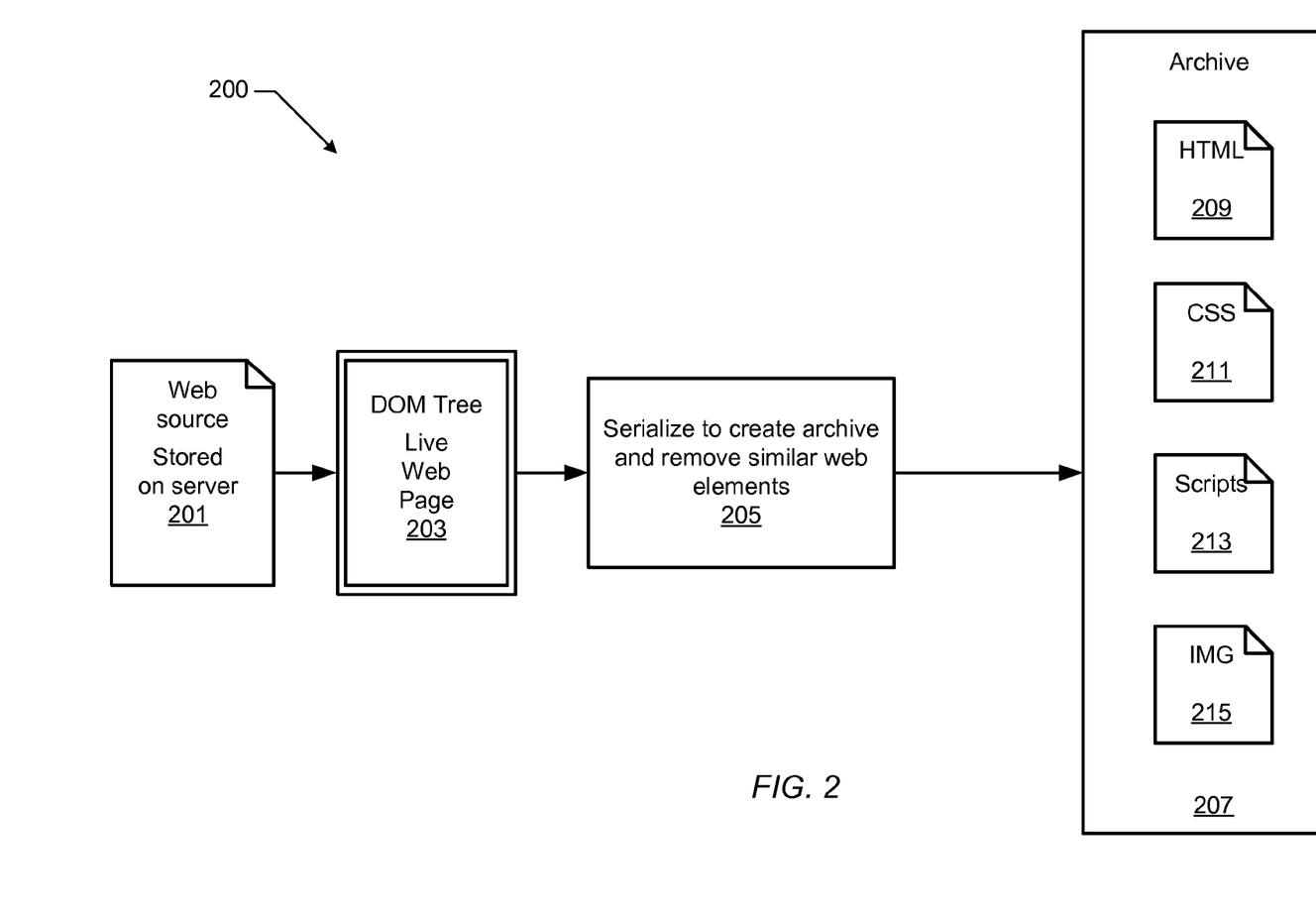
FIG. 2 shows steps for creating a web page archive.

FIG. 2 illustrates steps 200 for creating a web page archive in accordance with one embodiment described in the specification. Source files that include web content, images, scripts, etc. can be stored on server 201. When a client application, such as a web browser seeks to display web content, the source files can be retrieved from server 201. In one embodiment, the source files can be interpreted into a DOM tree and the DOM tree in turn can be processed to display "live" web page 203. The live web page 203 can include content described in source files provided by server 201 and can also include content determined by the execution of scripts that can also be included in source files stored on server 201. In order to create web archive 207, the live web page 203 can be analyzed and, in one embodiment, can be serialized 205 to create individual files included in web archive 207. Web archive 207 can include HTML 209 files, CSS 211 files, scripts 213 and images 215. In other embodiments, web archive 207 can include other files such as XML files or any other technically feasible files. In one embodiment, the serialization 205 can remove erroneous duplicate or similar objects that can be included in web archive 207. In other words, prior to storing individual files in web archive 207, serialization 205 can remove web elements that can result in erroneous duplicate or similar elements to appear in a web page later created from web archive 207. The serialization 205 process is described in further detail below in conjunction with FIG. 4.

Figure 3:
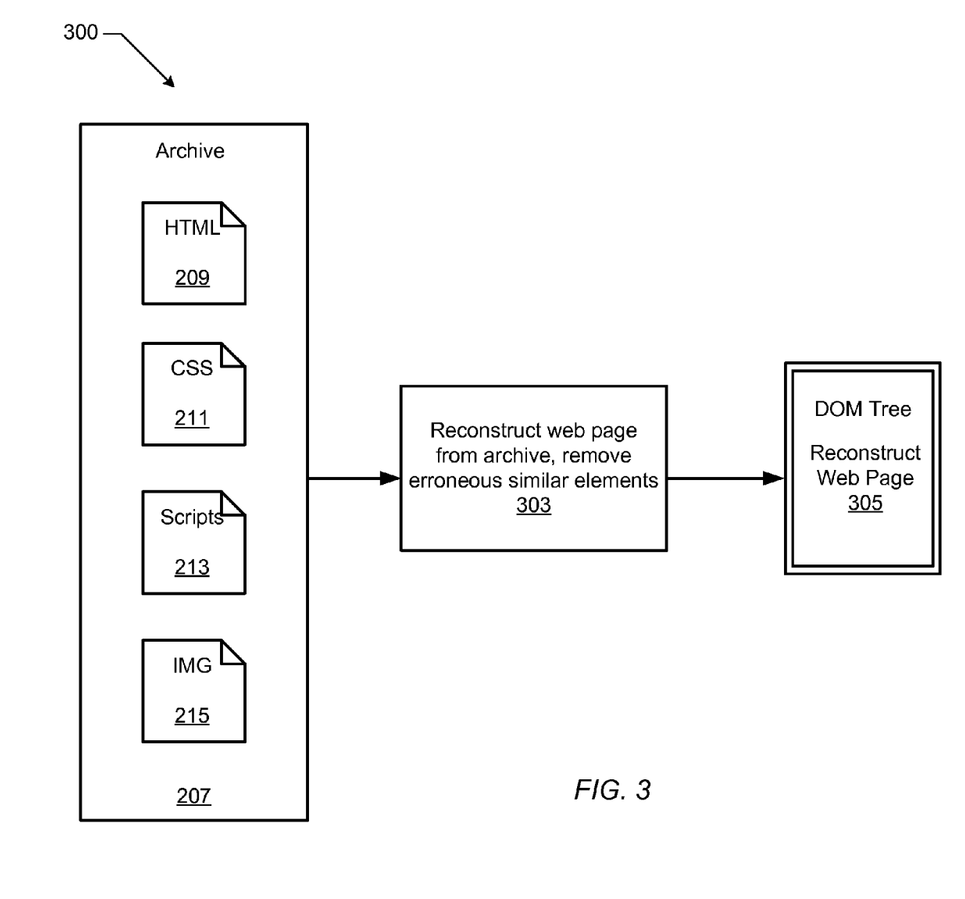
FIG. 3 illustrates steps for creating a web page from a web page archive.

FIG. 3 illustrates steps 300 for creating a web page 305 from a web archive 207 in accordance with one embodiment described in the specification. Web archive 207 can exist, for example, within a storage element of a computing device, oftentimes being stored within the computing device that created web archive 207. In other embodiments, web archive 207 can be stored remotely, but accessible to the user. Web archive 207 can include HTML 209 files, CSS 211 files, scripts 213 and images 215. In step 303, files from web archive 207 can be retrieved to reconstruct the related web page 305. In one embodiment, erroneous, similar web elements can be removed prior to displaying reconstructed web page 305. In one embodiment, the files from web archive 207 can be used to create a DOM tree that, in turn, can be used to create the reconstructed web page 305.

Figure 4:
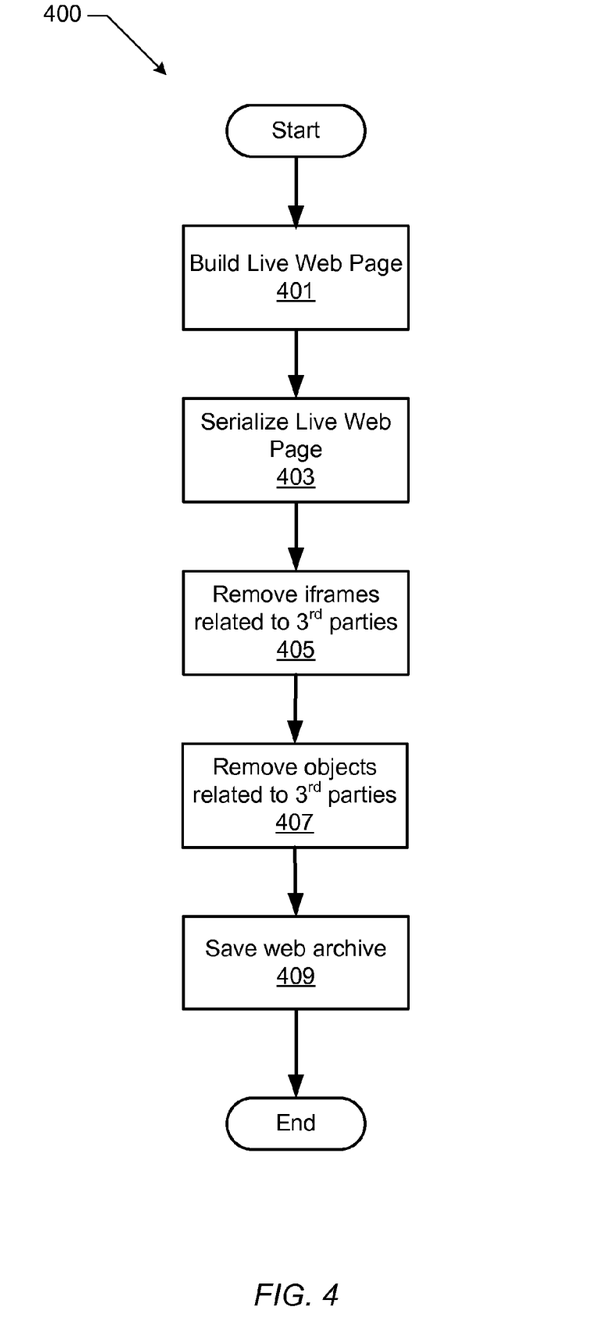
FIG. 4 shows a flow chart of method steps for creating a web page archive.

FIG. 4 shows a flow chart of method steps 400 for creating a web page archive 207. Persons skilled in the art will understand that any system configured to perform the method steps in any order is within the scope of this description. The method steps 400 can be used to create a web archive 207 that can be used to reconstruct a web page with fewer duplicated web elements. In one embodiment, the method steps described herein can be performed by a processor included in a computing device. The method can begin in step 401 where a live web page is displayed. Files related to the live web page can be typically retrieved by the processor from a web server, and the resulting live web page can be displayed. The live web page can include web elements that can come from HTML files or other elements that can be included by executing scripts. In step 403 the live web page can be serialized and potential files for web archive 207 can be created. In one embodiment, HTML 209 files, CSS 211 files, scripts 213 and images 215 can be created.

In step 405, the created files can be examined and any iframes related to a third party can be removed. Third party iframes are often advertisements and can be duplicated (i.e., two instances of the iframe can be displayed) when a web page is reconstructed from a related web archive. An iframe related to a third party can include an attribute that does not associate the iframe to the domain of the web site. Returning to our earlier example, if the web site domain is my_news.com, and an iframe is attributable or associated with a domain such as ads.doubleclick.com, then that iframe can be a third party iframe. In step 407, the files created in step 403 can be examined and any objects related to a third party can be removed from the files. For example an image inserted by a third party script can be removed from the created files. In step 409 the processed files can be saved to create web archive 207 and the method ends.

Figure 5:
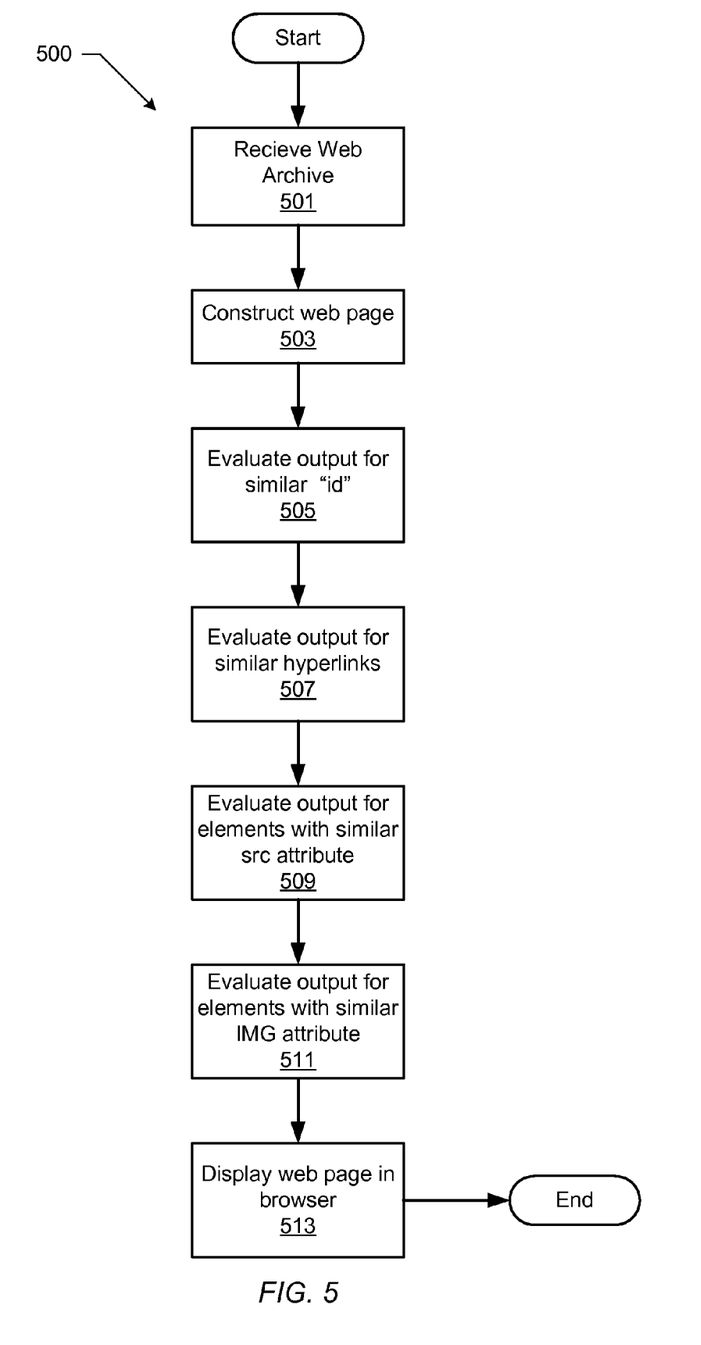
FIG. 5 shows a flow chart of method steps for removing duplicate web content from web data created from a web page archive.

FIG. 5 shows a flow chart of method steps 500 for removing duplicate web content from web data created from a web archive in accordance with one embodiment described in the specification. The method steps 500 can process web data reconstructed from web archive 207 to remove duplicate web elements. The method can begin in step 501 where web archive 207 is received. In one embodiment, web archive 207 can be created with method steps 400 described above in conjunction with FIG. 4. In another embodiment, web archive 207 can be created in any other technically feasible manner. As described above, web archive 207 can include HTML 209 files, CSS 211 files, scripts 213 and images 215. In step 503, web page 305 can be reconstructed from the web archive 207.

In step 505, web page 305 can be examined and any web elements with similar identification elements can be removed. This is described in more detail in conjunction with FIG. 6, below. In step 507, web page 305 can be examined and web elements with similar hyperlinks can be removed. This is described in more detail in conjunction with FIG. 7, below. In step 509, web page 305 can be examined and web elements with similar source attributes can be removed. This is described in more detail in conjunction with FIG. 8, below. In step 511, web page 305 can be examined and web elements with similar image attributes can be removed. This is described in more detail in conjunction with FIG. 9, below. In step 513, the processed web archive files can be used to reconstruct and display the related web page and the method ends.

Figure 6:
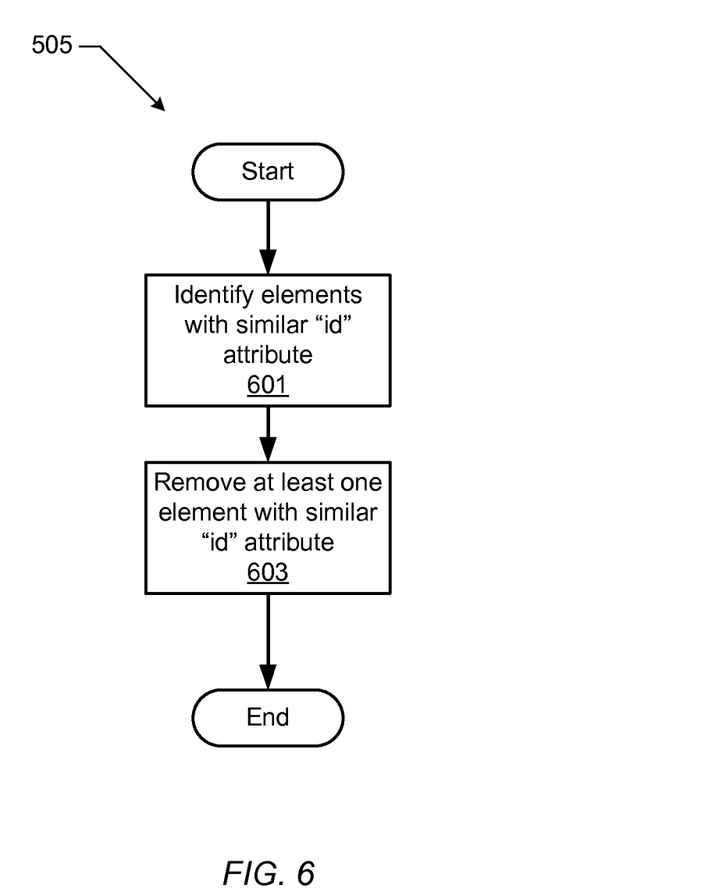
FIG. 6 shows details of method steps for removing duplicate web content that can include similar identification elements.

FIG. 6 shows details of method step 505 for removing duplicate web content that can include similar identification elements. Web elements, in particular elements represented by HTML text often include an identification (or "id") attribute. The id attribute can be used to uniquely identify a web element. For example, a web element with an id="fred" can captured during web archive 207 creation. A second and substantially similar web element also with an id="fred" can be included in web page 305 by a script executed during web page reconstruction. The substantially similar id values of "fred" can indicate that the web elements themselves are substantially similar, and are probably duplicates. In step 601, web page 305 can be examined and web elements with substantially similar web id's can be identified. In step 603, at least one of the web elements with substantially similar web id's can be removed from web page 305. Often duplicate web elements can be adjacent to one another in web page 305. In other embodiments, duplicate web elements can be separated by a space, a number of lines or other separating feature.

Figure 7:
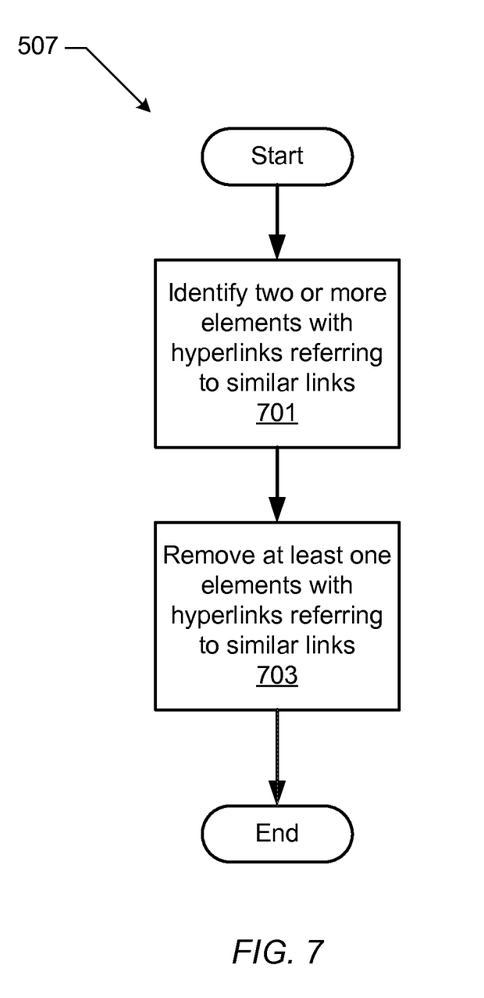
FIG. 7 shows details of method steps for removing duplicate web content that can include similar hyperlink elements.

FIG. 7 shows details of method step 507 for removing duplicate web content that can include similar hyperlink elements. Web page 305 can include hyperlinks that can direct a viewer of the web page to a different page within a current website or even other websites. In some instances, a script can include a hyperlink, and therefore a duplicate hyperlink can exist in web page 305 for the reasons set forth above. Substantially similar hyperlinks can be identified by, for example, string matching the referred to web address (also referred to as "url"). For example, the url "www.apple.com" is, according to one embodiment, considered to be substantially similar to the url "www.apple1.com". Alternatively, the url "www.apple.com/trailers" is, according to another embodiment, considered to be substantially similar to the url "www.apple.com/trailers/movie1." In step 701, web page 305 can be examined and web elements that include substantially similar hyperlinks can be identified. In step 703, at least one of the web elements with a substantially similar hyperlink can be removed from web page 305. Duplicate hyperlinks can appear adjacent to one another in web page 305, or can be separated from one another.

Figure 8:
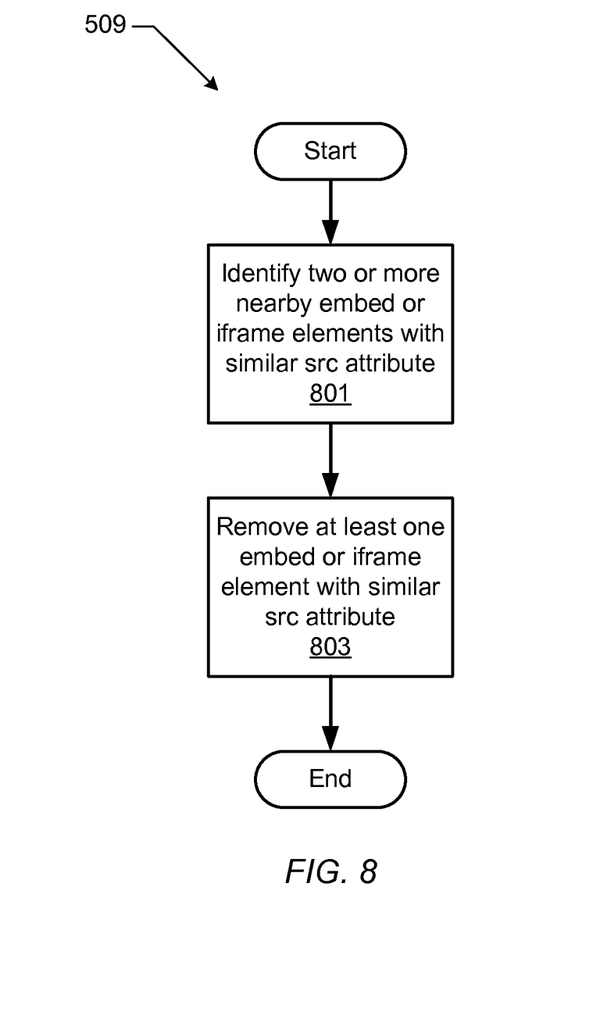
FIG. 8 shows details of method steps for removing duplicate web content that can include similar embed or iframe elements.

FIG. 8 shows details of method step 509 for removing duplicate web content including similar HTML embed or iframe elements. An embed attribute is HTML code that can be used in web page 305 to define an embedded external application or interactive content to be included with web page 305. Iframes, as described above, can be used to further include web content from other web sites or repositories. Since embeds and iframes can be inserted with an executing script, a duplicate embed or iframe can exist in reconstructed web page 305. In step 801, web page 305 can be examined and web elements that include similar iframe or embed instructions can be identified. In one embodiment, similar iframe or embed instructions can have substantially similar source (also referred to as "src") attributes. A source attribute can be used to specify an address or url of the external embed file or iframe file. In step 803, at least one of the duplicate embed or iframe instructions can be removed from web page 305. Duplicate embed or iframes can appear adjacent to one another in web page 305, or can be separated from one another.

Figure 9:
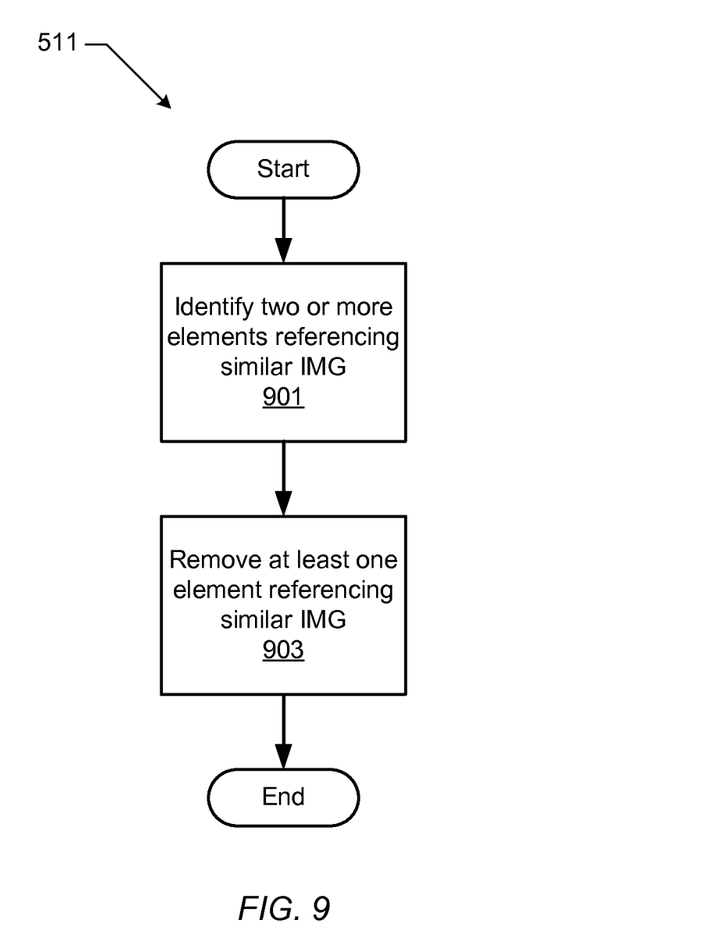
FIG. 9 shows details of method steps for removing duplicate web content that can include similar image elements.

FIG. 9 shows details of method step 511 for removing duplicate web content including similar image elements. Scripts can insert images in web page 305. As described above, a script can insert an image before the web archive 207 is created and again after the web page 305 is created from the web archive 207. An image included in web page 305 can include an image ("img") attribute that can specify, among other things, the source of the image. In step 901, web page 305 can be examined and web elements that refer to substantially similar images can be identified. In step 903, at least one of the substantially similar images can be removed from web page 305.

The methods described in FIGS. 4-9 describe methods for determining whether one or more duplicate or redundant web elements can be present in a reconstructed web page. Other embodiments can determine the addition of extra web elements in other ways. For example, in one embodiment, files used to create a web page can be compared before and after preparing and creating a web archive. If any differences are observed between the before and after versions of the web page files, then the web page archive may have included duplicate web elements. This method can be a brute force method and can be complex and can take a substantial amount of processing time. In another embodiment, differences may be detected by simply comparing file sizes, which although simpler in complexity, may not be as accurate as either the brute force approach or the approach described in FIGS. 4-9.

Figure 10:
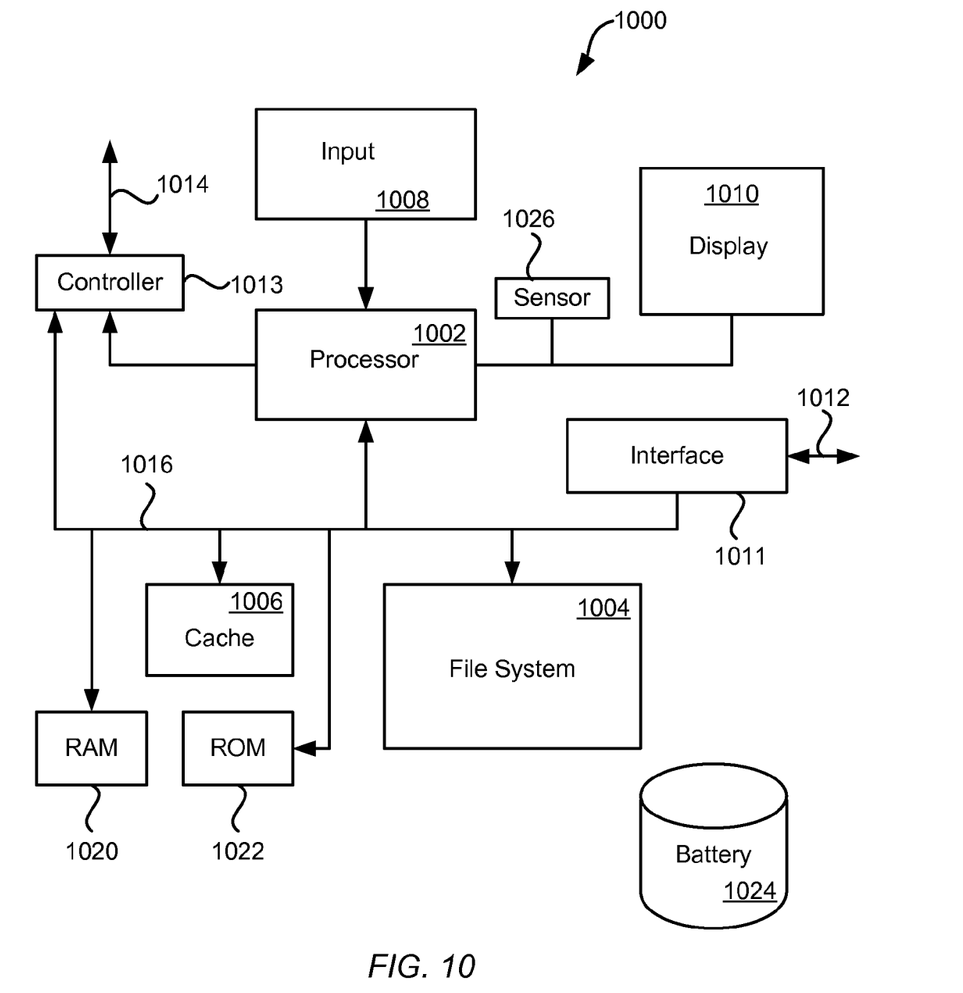
FIG. 10 is a block diagram of an electronic device suitable for controlling some of the processes in the described embodiments.

FIG. 10 is a block diagram of an electronic device suitable for controlling some of the processes in the described embodiment. Electronic device 1000 can illustrate circuitry of a representative computing device. Electronic device 1000 can include a processor 1002 that pertains to a microprocessor or controller for controlling the overall operation of electronic device 1000. Electronic device 1000 can include instruction data pertaining to manufacturing instructions in a file system 1004 and a cache 1006. File system 1004 can be a storage disk or a plurality of disks. In some embodiments, file system 1004 can be flash memory, semiconductor (solid state) memory or the like. The file system 1004 can typically provide high capacity storage capability for the electronic device 1000. However, since the access time to the file system 1004 can be relatively slow (especially if file system 1004 includes a mechanical disk drive), the electronic device 1000 can also include cache 1006. The cache 1006 can include, for example, Random-Access Memory (RAM) provided by semiconductor memory. The relative access time to the cache 1006 can substantially shorter than for the file system 1004. However, cache 1006 may not have the large storage capacity of file system 1004. Further, file system 1004, when active, can consume more power than cache 1006. Power consumption often can be a concern when the electronic device 1000 is a portable device that is powered by battery 1024. The electronic device 1000 can also include a RAM 1020 and a Read-Only Memory (ROM) 1022. The ROM 1022 can store programs, utilities or processes to be executed in a non-volatile manner. The RAM 1020 can provide volatile data storage, such as for cache 1006.

Electronic device 1000 can also include user input device 1008 that allows a user of the electronic device 1000 to interact with the electronic device 1000. For example, user input device 1008 can take a variety of forms, such as a button, keypad, dial, touch screen, audio input interface, visual/image capture input interface, input in the form of sensor data, etc. Still further, electronic device 1000 can include a display 1010 (screen display) that can be controlled by processor 1002 to display information to the user. Data bus 1016 can facilitate data transfer between at least file system 1004, cache 1006, processor 1002, and controller 1013. Controller 1013 can be used to interface with other computers, other display element or other networks though control bus 1014. For example, processor 1002, upon a certain events occurring, can supply instructions to control other equipment, such as manufacturing equipment through controller 1013 and control bus 1014. Such instructions can be stored in file system 1004, RAM 1020, ROM 1022 or cache 1006.

Electronic device 1000 can also include a network/bus interface 1011 that couples to data link 1012. Data link 1012 can allow electronic device 1000 to couple to a host computer or to accessory devices. The data link 1012 can be provided over a wired connection or a wireless connection. In the case of a wireless connection, network/bus interface 1011 can include a wireless transceiver. Sensor 1026 can take the form of circuitry for detecting any number of stimuli. For example, sensor 1026 can include any number of sensors for monitoring a manufacturing operation such as for example a Hall Effect sensor responsive to external magnetic field, an audio sensor, a light sensor such as a photometer, computer vision sensor to detect clarity, a temperature sensor to monitor a molding process and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for archiving web pages, the method comprising:
    at a web browser executing on a computing device:
    receiving a web page associated with a domain;
    constructing a web page archive from the web page, wherein:
        dynamically-added content within the web page is included in the web page archive when a source attribute of the dynamically-added content is associated with the domain, and
        dynamically-added content within the web page is omitted from the web page archive when the source attribute of the dynamically-added content is not associated with the domain;
    rendering a copy of the web page based on the web page archive;
    automatically identifying, by comparing the copy of the web page and the web page, that at least one duplicate item exists within the copy of the web page;
    producing a modified web page archive that, when subsequently rendered into a restored web page, will not include the at least one duplicate item; and
    storing the modified web page archive.

2. The method of claim 1, wherein the modified web page archive comprises one or more of the following: hypertext mark-up language, executable scripts, image files, and style sheets.

3. The method of claim 1, wherein the dynamically-added content is inserted into the web page by a script.

4. The method of claim 1, wherein the dynamically-added content is an inline-frame.

5. The method of claim 1, wherein the dynamically-added content is an object.

6. The method of claim 1, further comprising:
    rendering the restored web page based on the modified web page archive.

7. The method of claim 1, wherein receiving the web page comprises receiving data of which the web page is comprised, and the web page archive is constructed from the data.

8. A method for archiving web pages, the method comprising:
    at a computing device:
    receiving a web page associated with a domain;
    constructing a web page archive from the web page, wherein:
        dynamically-added content within the web page is included in the web page archive when a source attribute of the dynamically-added content is associated with the domain, and
        dynamically-added content within the web page is omitted from the web page archive when the source attribute of the dynamically-added content is not associated with the domain;
    rendering a copy of the web page based on the web page archive;
    automatically identifying, by comparing the copy of the web page and the web page, that at least one duplicate item exists within the copy of the web page;
    producing a modified web page archive that, when subsequently rendered into a restored web page, will not include the at least one duplicate item;
    storing the modified web page archive; and
    rendering the restored web page based on the modified web page archive.

9. The method of claim 8, wherein the modified web page archive comprises one or more of the following: hypertext mark-up language, executable scripts, image files, and style sheets.

10. The method of claim 8, wherein the dynamically-added content is inserted into the web page by a script.

11. The method of claim 8, wherein the dynamically-added content is an inline-frame.

12. The method of claim 8, wherein the dynamically-added content is an object.

13. The method of claim 8, wherein receiving the web page comprises receiving data of which the web page is comprised, and the web page archive is constructed from the data.

14. The method of claim 8, wherein a web browser is executing on the computing device and implements the method for archiving web pages.

15. A non-transitory computer readable storage medium configured to store instructions that, when executed by a processor included in a computing device, cause the computing device to archive web pages, by carrying out steps that include:
    receiving a web page associated with a domain;
    constructing a web page archive from the web page, wherein:
        dynamically-added content within the web page is included in the web page archive when a source attribute of the dynamically-added content is associated with the domain, and
        dynamically-added content within the web page is omitted from the web page archive when the source attribute of the dynamically-added content is not associated with the domain;
    rendering a copy of the web page based on the web page archive;

automatically identifying, by comparing the copy of the web page and the web page, that at least one duplicate item exists within the copy of the web page;

producing a modified web page archive that, when subsequently rendered into a restored web page, will not include the at least one duplicate item; and storing the modified web page archive.

16. The non-transitory computer readable storage medium of claim 15, wherein the modified web page archive comprises one or more of the following: hypertext mark-up language, executable scripts, image files, and style sheets.

17. The non-transitory computer readable storage medium of claim 15, wherein the dynamically-added content is inserted into the web page by a script.

18. The non-transitory computer readable storage medium of claim 15, wherein the dynamically-added content is an inline-frame.

19. The non-transitory computer readable storage medium of claim 15, wherein the dynamically-added content is an object.

20. The non-transitory computer readable storage medium of claim 15, wherein the steps further include:

rendering the restored web page based on the modified web page archive.

21. The non-transitory computer readable storage medium of claim 15, wherein receiving the web page comprises receiving data of which the web page is comprised, and the web page archive is constructed from the data.

22. A computing device, comprising:

a processor configured to cause the computing device to archive web pages, by carrying out steps that include:

receiving a web page associated with a domain;

constructing a web page archive from the web page, wherein:

dynamically-added content within the web page is included in the web page archive when a source attribute of the dynamically-added content is associated with the domain, and dynamically-added content within the web page is omitted from the web page archive when the source attribute of the dynamically-added content is not associated with the domain;

rendering a copy of the web page based on the web page archive;

automatically identifying, by comparing the copy of the web page and the web page, that at least one duplicate item exists within the copy of the web page;

producing a modified web page archive that, when subsequently rendered into a restored web page, will not include the at least one duplicate item; and storing the modified web page archive.

23. The computing device of claim 22, wherein the modified web page archive comprises one or more of the following: hypertext mark-up language, executable scripts, image files, and style sheets.

24. The computing device of claim 22, wherein the steps further include:

rendering the restored web page based on the modified web page archive.

25. The computing device of claim 22, wherein receiving the web page comprises receiving data of which the web page is comprised, and the web page archive is constructed from the data.

* * * * *